United States Patent
Li et al.

(10) Patent No.: US 11,659,602 B2
(45) Date of Patent: May 23, 2023

(54) WIRELESS NETWORK CONNECTION MANAGEMENT METHOD

(71) Applicant: Wistron Corporation, New Taipei (TW)

(72) Inventors: Shao-Wei Li, New Taipei (TW); Shih-Ting Wang, New Taipei (TW); Yu-Wei Fan, New Taipei (TW)

(73) Assignee: Wistron Corporation, New Taipei (TW)

( * ) Notice: Subject to any disclaimer, the term of this patent is extended or adjusted under 35 U.S.C. 154(b) by 222 days.

(21) Appl. No.: 17/145,411

(22) Filed: Jan. 11, 2021

(65) Prior Publication Data

US 2022/0150989 A1    May 12, 2022

(30) Foreign Application Priority Data

Nov. 6, 2020 (TW) .................. 109138803

(51) Int. Cl.
*H04W 28/08* (2023.01)
*H04W 8/18* (2009.01)
*H04W 76/10* (2018.01)

(52) U.S. Cl.
CPC ........... *H04W 76/10* (2018.02); *H04W 8/183* (2013.01)

(58) Field of Classification Search
CPC . H04W 76/10; H04W 8/183; H04W 28/0804; H04W 28/0958; H04W 48/16; H04W 48/18; H04W 24/08; H04W 76/20
See application file for complete search history.

(56) References Cited

U.S. PATENT DOCUMENTS

| | | | |
|---|---|---|---|
| 9,474,002 B2 * | 10/2016 | Gopal | H04W 48/16 |
| 2014/0036710 A1 | 2/2014 | Chin | |
| 2015/0065132 A1 * | 3/2015 | Ramkumar | H04W 48/16 |
| | | | 455/435.2 |

FOREIGN PATENT DOCUMENTS

| | | | | |
|---|---|---|---|---|
| TW | I586121 B | 6/2017 | | |
| WO | WO-2008071602 A1 * | 6/2008 | ............ | H04W 8/183 |
| WO | WO-2019218124 A1 * | 11/2019 | ........ | H04M 1/72403 |

* cited by examiner

*Primary Examiner* — Joseph E Dean, Jr.
(74) *Attorney, Agent, or Firm* — Winston Hsu (57) ABSTRACT

A wireless network connection management method includes at least one universal integrated circuit card (UICC) starting a search timer when utilizing a non-priority subscriber identity module (SIM) to establish a connection with a non-priority wireless network; the at least one UICC sending a search command to a wireless communication device in response to a first condition, wherein the first condition is that the search timer expires; a wireless communication device searching for and obtaining a current network status, and sending a reply message indicating the current network status to the at least one UICC; and in response to that the current network status indicates that a signal strength of a priority wireless network is greater than a specific signal strength, the at least one UICC informing and switching to the priority wireless network, and transmitting an update command to the wireless communication device.

20 Claims, 7 Drawing Sheets

FIG. 7

WIRELESS NETWORK CONNECTION MANAGEMENT METHOD

BACKGROUND OF THE INVENTION

1. Field of the Invention

The present invention relates to a wireless network connection management method, and more specifically, to a wireless network connection management method for a wireless communication device and at least one universal integrated circuit card (UICC).

2. Description of the Prior Art

In a multiple subscriber identity module (SIM) wireless communication device, it utilizes different SIMs to connect to different wireless networks, e.g. public land mobile networks (PLMNs), of different service providers via a plurality of removable UICCs corresponding to the different SIMs, or an embedded UICC (eUICC) corresponding to a plurality of electronic SIMs (eSIMs).

However, when the current service provider provides poor signal quality or no network service, the user must manually switch to another SIM via the user interface to connect to another service provider to access network service. Otherwise, a fall back mechanism automatically selects other service providers to reestablish network connection when the preferred service provider (e.g. charging a lower fee) provides poor signal quality or no network service. However, there is currently no specification on how to return back to the originally preferred and selected service provider after the fallback mechanism selects another service provider (for example, to return back to the service provider charging a lower fee from another service provider charging a higher fee).

In this regard, it is necessary to improve over the prior art.

SUMMARY OF THE INVENTION

It is therefore an objective of the present invention to provide a wireless network connection management method for a wireless communication device and at least one UICC.

The present invention discloses a wireless network connection management method for a wireless communication device and at least one universal integrated circuit card (UICC). The at least one UICC is disposed in the wireless communication device and the at least one UICC is corresponding to a plurality of subscriber identity modules (SIMs). The wireless network connection management method includes the at least one UICC starting a search timer when utilizing a non-priority SIM of the plurality of SIMs to establish a connection with a non-priority wireless network; the at least one UICC sending a search command to the wireless communication device in response to a first condition, wherein the first condition is that the search timer expires; the wireless communication device searching for and obtaining a current network status, and sending a reply message indicating the current network status to the at least one UICC; and the at least one UICC informing and switching to a priority wireless network, and transmitting an update command to the wireless communication device in response to that the current network status indicates that a signal strength of the priority wireless network corresponding to a priority SIM of the plurality of SIMs is greater than a specific signal strength.

The present invention further discloses a wireless network connection management method for a wireless communication device and at least one universal integrated circuit card (UICC). The at least one UICC is disposed in the wireless communication device and the at least one UICC is corresponding to a plurality of subscriber identity modules (SIMs). The wireless network connection management method includes an automatic selection application of the wireless communication device sending a measurement message indicating to search for a current network status; and the automatic selection application selecting a specific SIM of the plurality of SIMs to establish a connection with a corresponding specific wireless network according to the current network status.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
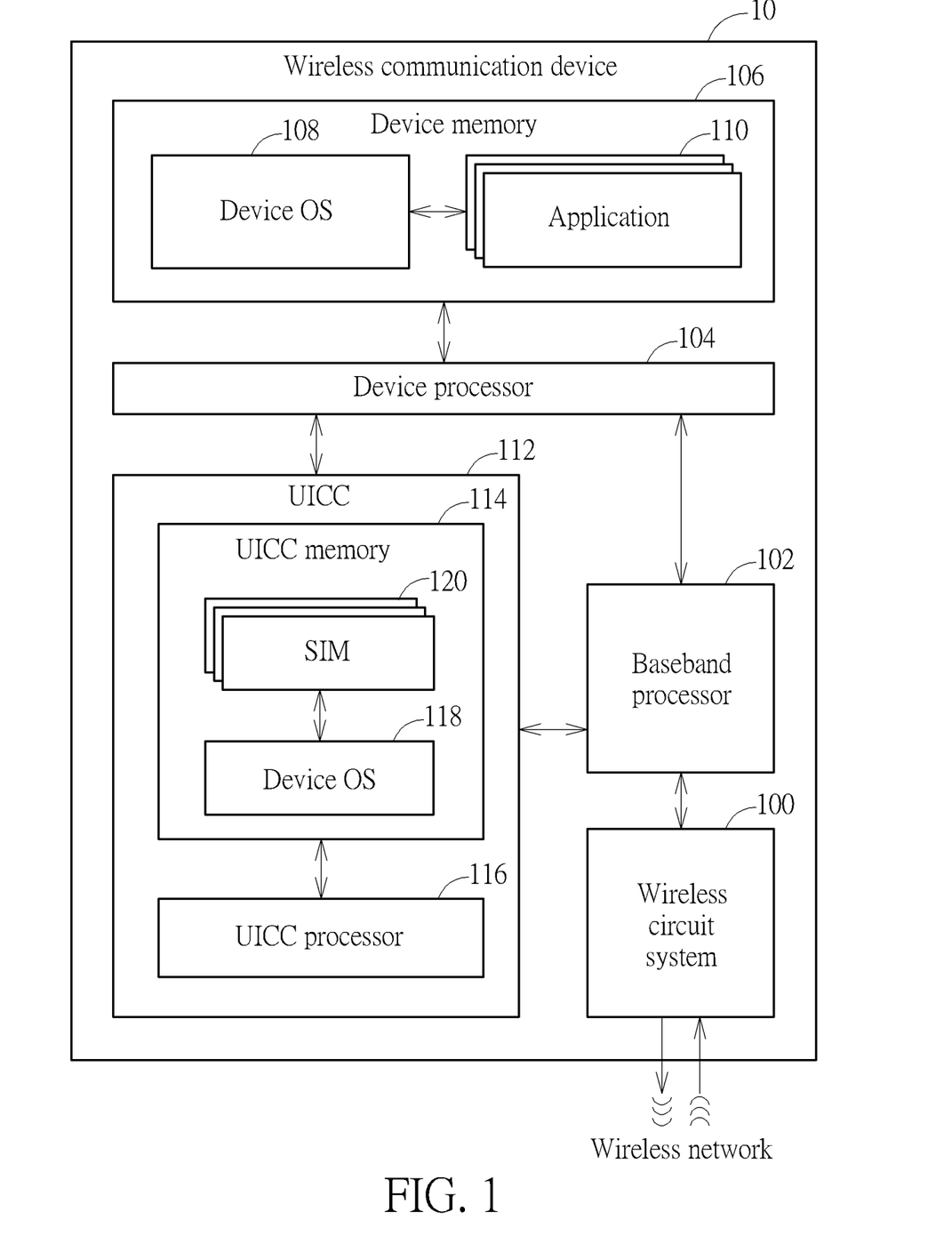
FIG. 1 is a schematic diagram of a wireless communication device and a UICC according to an embodiment of the present invention.

Please refer to FIG. 1, which is a schematic diagram of a wireless communication device 10 and at least one universal integrated circuit card (UICC) 112 according to an embodiment of the present invention. The at least one UICC 112 is electrically connected to the wireless communication device 10, and is disposed in the wireless communication device 10. The wireless communication device 10 includes a wireless circuit system 100, a baseband processor 102, a device processor 104 and a device memory 106. The wireless communication device 10 is a multiple subscriber identity module (multi-SIM) wireless communication device. The wireless circuit system 100 may transmit and receive radio-frequency wireless signals with a wireless network (such as a public land mobile networks (PLMN)) corresponding to a SIM. The baseband processor 102 is utilized for network services and is responsible for managing all radio frequency services that require antennas. The device memory 106 may store a device operating system (OS) 108 and one or more applications 110. The device processor 104 may provide higher-layer functional processing (for example, for the application layer and/or for the transport layer), and the baseband processor 102 may provide lower-layer functional processing (for example, for the physical layer, for the media access control layer and/or for the network layer).

On the other hand, the wireless communication device 10 further includes the at least one UICC 112, and the at least one UICC 112 may be a single embedded UICC and includes a UICC memory 114 and a UICC processor 116. The UICC memory 114 may store a UICC OS 118 and a plurality of SIMs 120. The UICC memory 114 and the UICC processor 116 may make the UICC OS 118 to be run on the UICC 112 to manage the plurality of SIMs 120 (such as a plurality of electronic SIMs (eSIM)). The device processor 104, the UICC processor 116 and the baseband processor 102 may operate together to enable the wireless communication device 10 to establish a connection with one or more wireless network and access services on the one or more wireless networks. Notably, FIG. 1 illustrates that the at least one UICC 112 may be a single eUICC, but in practice, the at least one UICC 112 may also implemented by a plurality of removable UICCs corresponding to the plurality of SIMs, respectively, e.g. dual sim dual active (DSDA), or dual card dual standby (DSDS), and is not limited thereto. The following description utilizes a single eUICC for explanation.

Figure 2:
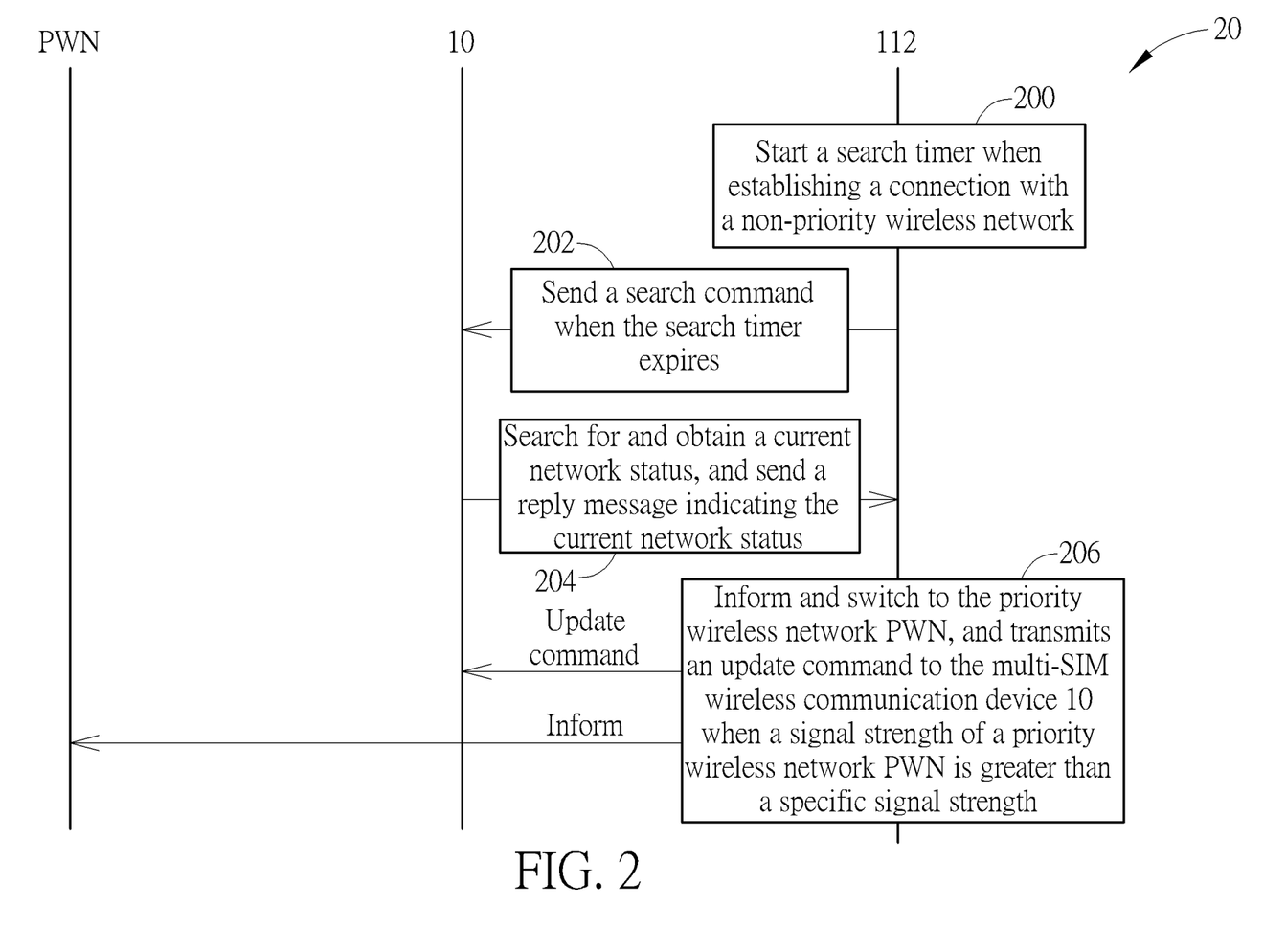
FIG. 2 is a schematic diagram of a wireless network connection management process according to an embodiment of the present invention.

Wireless network connection management operations of the wireless communication device 10 and the UICC 112 corresponding to the plurality of SIMs 120 may be summarized as a wireless network connection management process 20 as shown in FIG. 2. The wireless network connection management process 20 includes the following steps:

Step 200: The UICC 112 starts a search timer when utilizing a non-priority SIM of the plurality of SIMs 120 to establish a connection with a non-priority wireless network.

Step 202: The UICC 112 sends a search command to the wireless communication device 10 in response to a first condition, wherein the first condition is that the search timer expires.

Step 204: The wireless communication device 10 searches for and obtains a current network status, and sends a reply message indicating the current network status to the UICC 112.

Step 206: In response to that the current network status indicates that a signal strength of a priority wireless network PWN corresponding to a priority SIM of the plurality of 120 SIMs is greater than a specific signal strength, the UICC 112 informs and switches to the priority wireless network PWN, and transmits an update command to the multi-SIM wireless communication device 10.

First, the UICC 112 starts a search timer (similar to a high priority PLMN search timer) when utilizing a non-priority SIM of the plurality of SIMs 120 to establish a connection with a non-priority wireless networks (e.g., in response to that the signal strength of the priority wireless networks PWN is less than a specific signal strength, the present invention activates a fall back mechanism to establish the connection with the non-priority wireless network with a signal strength greater than the specific signal strength, or directly establishes the connection with the non-priority wireless network when the wireless communication device is turned on, wherein the non-priority wireless network was established with a connection before the wireless communication device was previously turned off) The search timer may be designed in Platform Service Manager responsible for managing ISD-R and ISD-P in the UICC OS 118. It is worth noting that when establishing the connection with the non-priority wireless network and starting the search timer for a first time, the search timer may be set to have a first time interval, and when establishing the connection with the non-priority wireless network and starting the search timer not for the first time, the search timer may be set to have a second time interval, where the first time interval may be less than or equal to the second time interval (for example, the second time interval may be a multiple of the first time interval). As a result, the present invention may quickly switch back to the priority wireless network PWN when establishing the connection with the non-priority wireless network due to short-term interference, and may reduce the frequency of searching network status and thus reduce power consumption when the priority wireless network PWN may not provide services for a long time, thereby enhancing flexibility.

Next, in step 200, in response to that the search timer expires (the first time interval or the second time interval expires), the UICC 112 sends a search command to the wireless communication device 10 (e.g., a SIM card sends a modem command AT command of Proactive Command to indicate to a device to search network status (COPS+)). The search command indicates to the wireless communication device 10 to search for and obtain a current network status, and then send a reply message indicating the current network status to the UICC 112 (e.g., the device reply commands of the SIM card with a message Terminal Response), so that the UICC 112 may acquire the current status of all wireless networks in addition to the service status of the non-priority wireless network with established connection. After that, in response to that the current network status indicates that the signal strength of the priority wireless network PWN corresponding to the priority SIM of the plurality of SIMs 120 is greater than a specific signal strength, the UICC 112 informs and switches to the priority wireless network PWN, and transmits an update command to the wireless communication device 10 (e.g., the SIM card sends Refresh Command to inform the device when changing a service provider). On the other hand, in response to that the current network status indicates that the signal strength of the priority wireless network PWN is less than the specific signal strength, the UICC 112 restarts the search timer and repeats the above operations in response to that the search timer expires. As a result, when establishing the connection with the non-priority wireless networks, the present invention may switch back to connect with the priority radio network PWN in response to that the search timer expires and the signal strength of the priority wireless network PWN is strong enough.

It is worth noting that the above embodiment is to start the search timer when establishing a connection with a non-priority wireless network, and search for the network status in response to that the search timer expires, to determine whether the signal of the priority wireless network PWN is strong enough and switch back to connect with the priority wireless network PWN accordingly. Those skilled in the art may make modifications or alterations accordingly, which are not limited to this. For example, in the above-mentioned embodiment, when a connection is established with a non-priority wireless network, the network status is searched after the first time interval when the search timer is started for the first time, and then the network status is searched after the longer second time interval when the search timer is subsequently started. However, in other embodiments, the time interval of the search timer may also be designed in other ways.

Figure 3A:
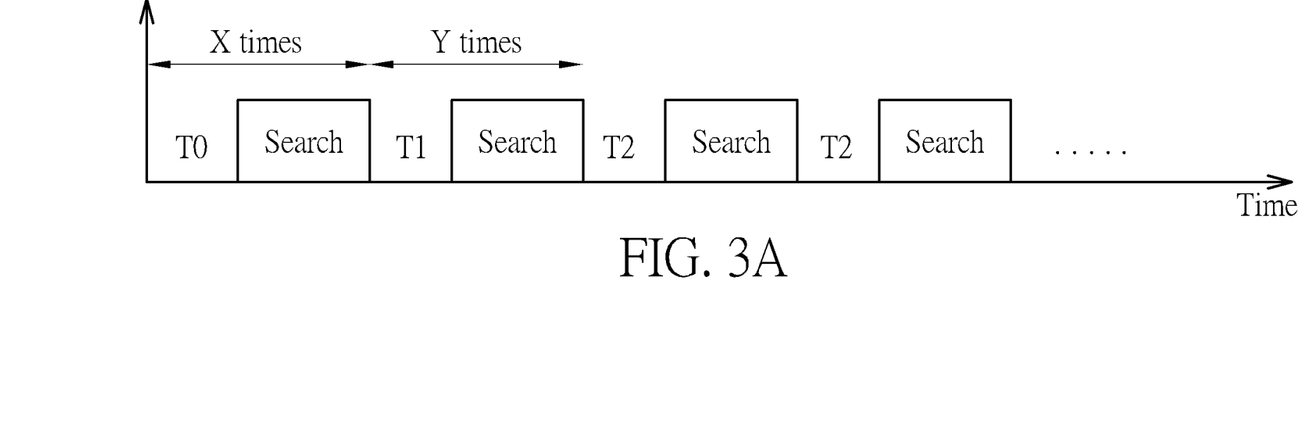
FIG. 3A and FIG. 3B are schematic diagrams of operations of a search timer according to embodiments of the present invention.

For example, please refer to FIG. 3A and FIG. 3B. FIG. 3A and FIG. 3B are schematic diagrams of operations of the search timer according to embodiments of the present invention. As shown in FIG. 3A, in response to that the connection with the non-priority wireless network is established and the number of times of starting the search timer are less than or equal to a specific number X of times, the present invention sets the search timer to have a time interval T0 and searches for the network status after expiration. In response to that the connection with the non-priority wireless network is established and the number of times of starting the search timer are greater than the specific number X of times, the present invention sets the search timer to have a time interval T1 and searches for the network status after expiration, where the time interval T0 is less than the time interval T1. Then, in response to that the connection with the non-priority wireless network is established and the number of times of starting the search timer with the time interval T1 are greater than a specific number Y of times, the search timer is set to have a time interval T2 and the network status is searched after expiration, where the time T1 interval is less than the time interval T2. As a result, the present invention may more quickly switch back to the priority wireless network PWN when establishing the connection with the non-priority wireless network due to short-term interference, and may gradually reduce the frequency of searching network status and thus reduce more power consumption when the priority wireless network PWN may not provide services for a long time.

Figure 3B:
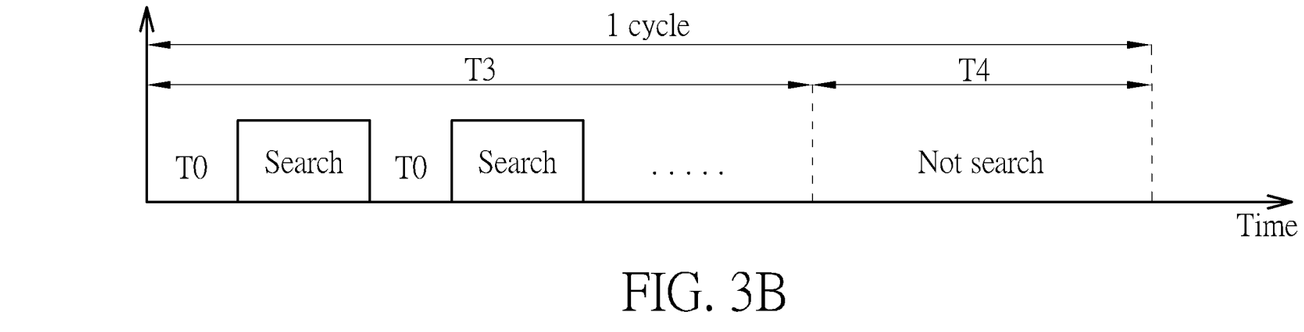

On the other hand, as shown in FIG. 3B, in response to that a connecting time of establishing the connection with the non-priority wireless network in each cycle of at least one subsequent cycle is less than or equal to a specific time length T3, the search timer is set to have a time interval T0 and network status is searched after expiration. In response to that the connecting time of establishing the connection with the non-priority wireless network in the each cycle of the at least one cycle is greater than the specific time length T3, the search timer is not started and network status is not searched. A time length of the each cycle is the specific time length T3 plus a specific time length T4 (i.e. the search timer is not started in the specific time length T4 of the each cycle). As a result, the present invention may not start the search timer in the specific time length T4 of the each cycle, and does not search the network status to save power consumption.

Figure 4:
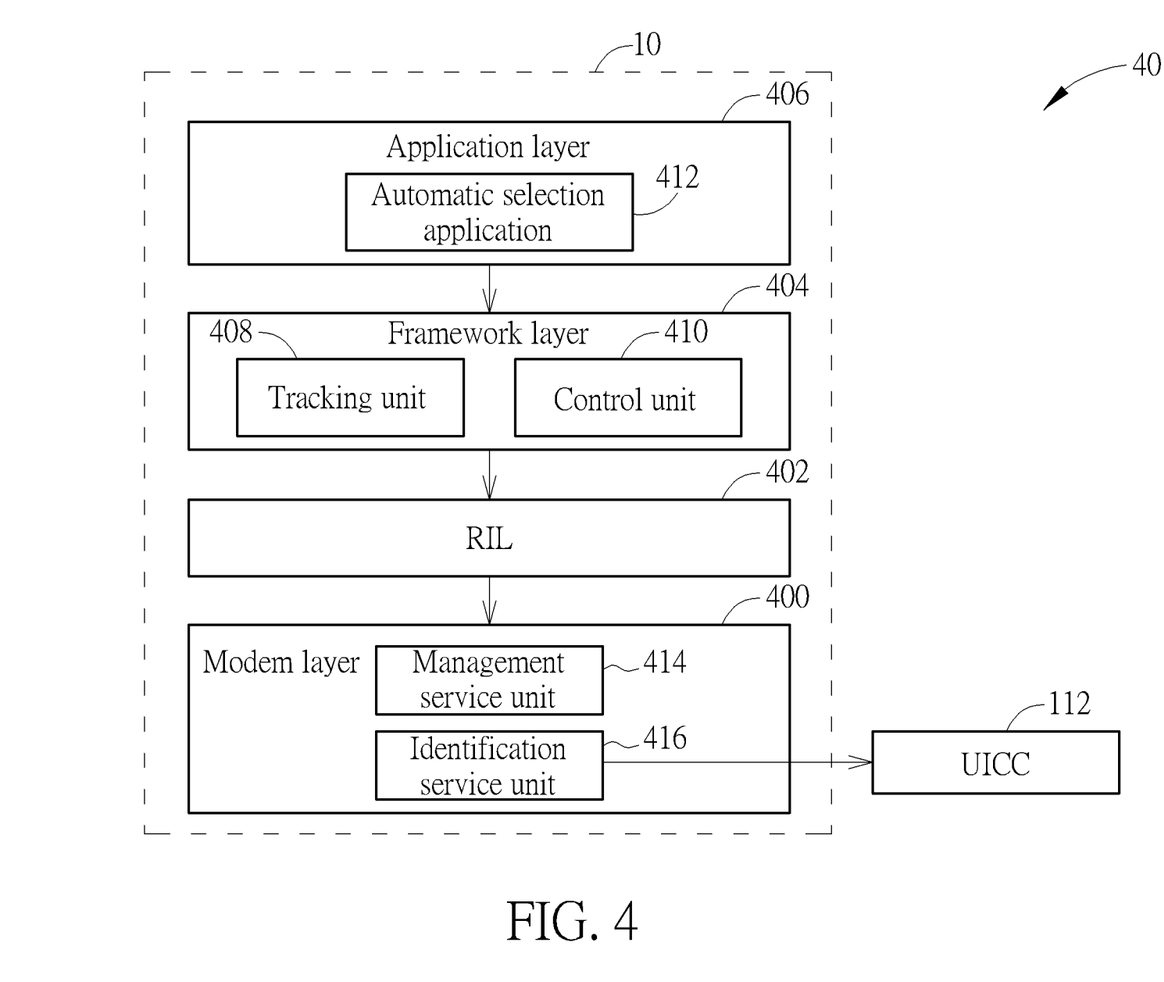
FIG. 4 is a schematic diagram of a software architecture of the wireless communication device and the UICC shown in FIG. 1 according to an embodiment of the present invention.

In addition, please refer to FIG. 4, which is a schematic diagram of a software architecture 40 of the wireless communication device 10 and the UICC 112 shown in FIG. 1 according to an embodiment of the present invention. As shown in FIG. 4, the wireless communication device 10 includes a modem layer 400, a radio interface layer (RIL) 402, a framework layer 404, and an application layer 406. The modem layer 400 includes a management service unit 414 and an identification service unit 416. The management service unit 414 may utilize, for example, a local profile assistant (LPA) to manage the SIMs 120, and the identification service unit 416 may provide SIM services such as user identity module (UIM) services. The modem layer 400 may communicate with wireless network via modulation and demodulation of wireless transmission, such as 2G, 3G, 4G, or/and 5G wireless transmission. The radio interface layer 402 is a transition layer for transferring messages between the modem layer 400 and the device OS 108 (e.g., Android OS). The framework layer 404 includes a tracking unit 408 (e.g., ServiceStateTracker unit), and a control unit 410 (e.g. UimLpaService unit). The tracking unit 408 may track the connection status of the modem layer 400 and acquire the latest network connection status. The control unit 410 may control SIMs of the UICC 112 for establishing a wireless connection, and via the menu on the screen of the wireless communication device 10, the user may control the SIMs for establishing the wireless connection through the control unit 410. Furthermore, in addition to the above existing service units, the present invention further includes an automatic selection application 412 in the application layer 406 (e.g. AutoSelectProfile application). The automatic selection application 412 may send a measurement message indicating to search for a current network status, and then select a specific SIM of the plurality of SIMs 120 to establish a connection with a corresponding specific wireless network according to the current network status. As a result, the present invention may automatically select the appropriate SIM to establish the connection with the corresponding wireless network according to the current network state.

Figure 5:
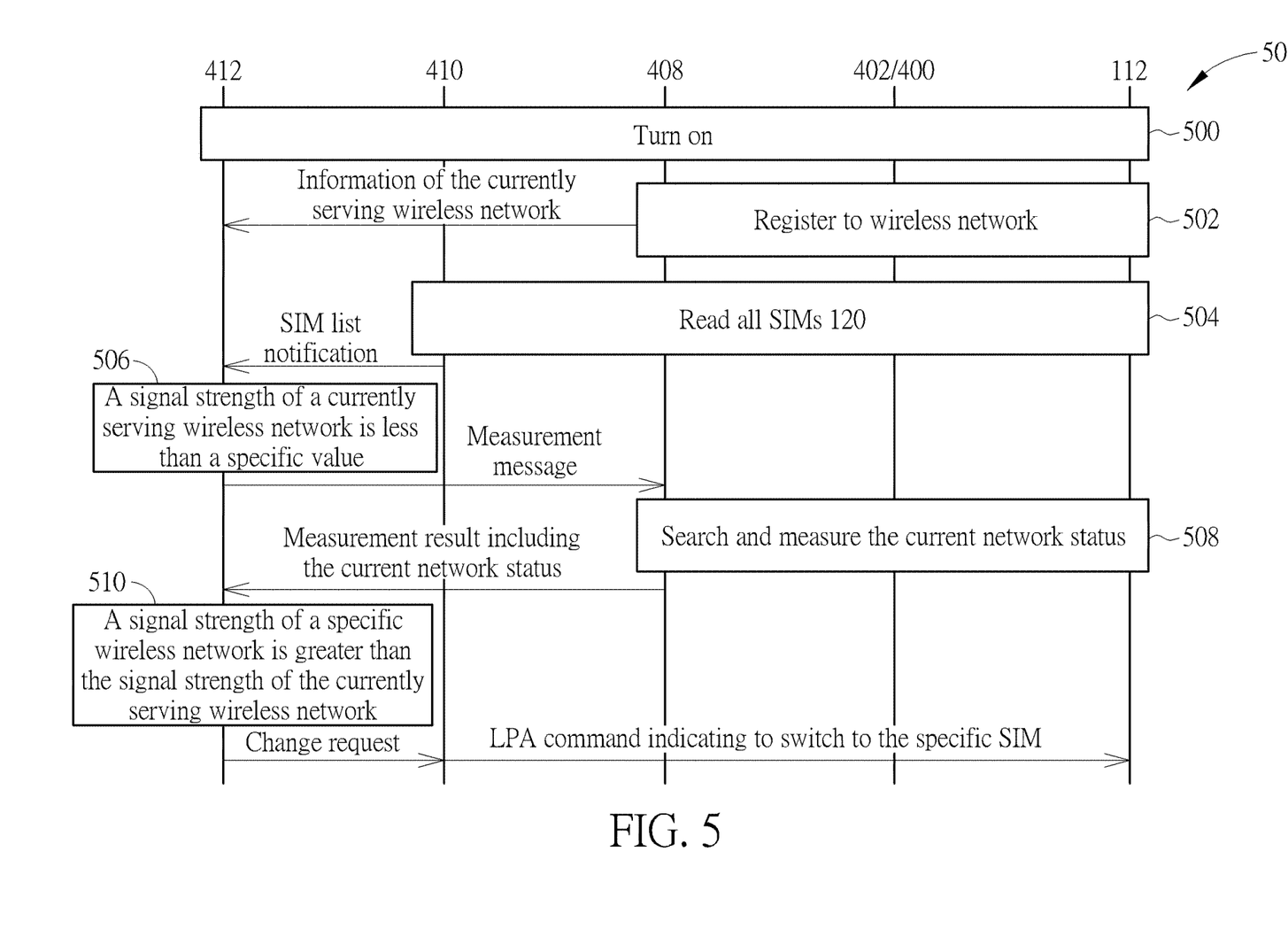
FIG. 5 is a schematic diagram of a wireless network connection management process of the software architecture shown in FIG. 4 according to an embodiment of the present invention.

In short, in one embodiment, in response to that the signal quality of the currently serving wireless network is poor, the automatic selection application 412 searches network signals according to the plurality of SIMs 120, and automatically selects to establish a connection with the wireless network with the best signal quality according to network search results. Specifically, please refer to FIG. 5, which is a schematic diagram of a wireless network connection management process 50 of the software architecture 40 shown in FIG. 4 according to an embodiment of the present invention. As shown in FIG. 5, after turned on in step 500, in step 502, the present invention utilizes one of the plurality of SIMs 120 (such as a predefined SIM or a previously utilized SIM before previously turned off) to register to a corresponding wireless network, and then sends information of the currently serving wireless network to the automatic selection application 412. Then, in step 504, all the SIMs 120 are read, and a SIM list notification is sent to the automatic selection application 412. In step 506, in response to that a signal strength of a currently serving wireless network is less than a specific value (e.g., the signal strength is level 0 or 1 listed in Table 1), the automatic selection application 412 sends a measurement message indicating to search for the currently network status. In step 508, after searching (such as performing manual search) and measuring the current network status, a measurement result including the current network status is sent to the automatic selection application 412. In step 510, in response to that the current network status in the measurement result indicates that a signal strength of a specific wireless network corresponding to a specific SIM is greater than the signal strength of the currently serving wireless network (e.g. the signal strength of the specific wireless network is greatest in the current network status), the automatic selection application 410 selects to connect with the specific wireless network, and sends a change request to the control unit 410. Then, the control unit 410 sends a command (e.g., LPA command) to indicate to the UICC 112 to switch to the specific SIM. As a result, in response to that the signal quality of the currently serving wireless network is poor, the present invention automatically searches for network signals and automatically selects to establish a connection with the wireless network with the best signals accordingly.

TABLE 1

| Signal Strength Level | | | |
| --- | --- | --- | --- |
| Level | GSM/WCDMA | CDMA | LTE |
| 0 | dBm < −109 | Ecio < −150 | Rsrp > −140, Rssnr > −200, RSSI > 63 |
| 1 | −109 < dBm < −103 | Ecio > −150 | Rsrp > −115, Rssnr > −30, RSSI > 0 |
| 2 | dBm > −103 | Ecio > −130 | Rsrp > −105, Rssnr > −10, RSSI > 5 |
| 3 | dBm > −97 | Ecio > −100 | Rsrp > −95, Rssnr > 45, RSSI > 8 |
| 4 | dBm > −89 | Ecio > −90 | Rsrp > −85, Rssnr > 130, RSSI > 12 |

Figure 6:
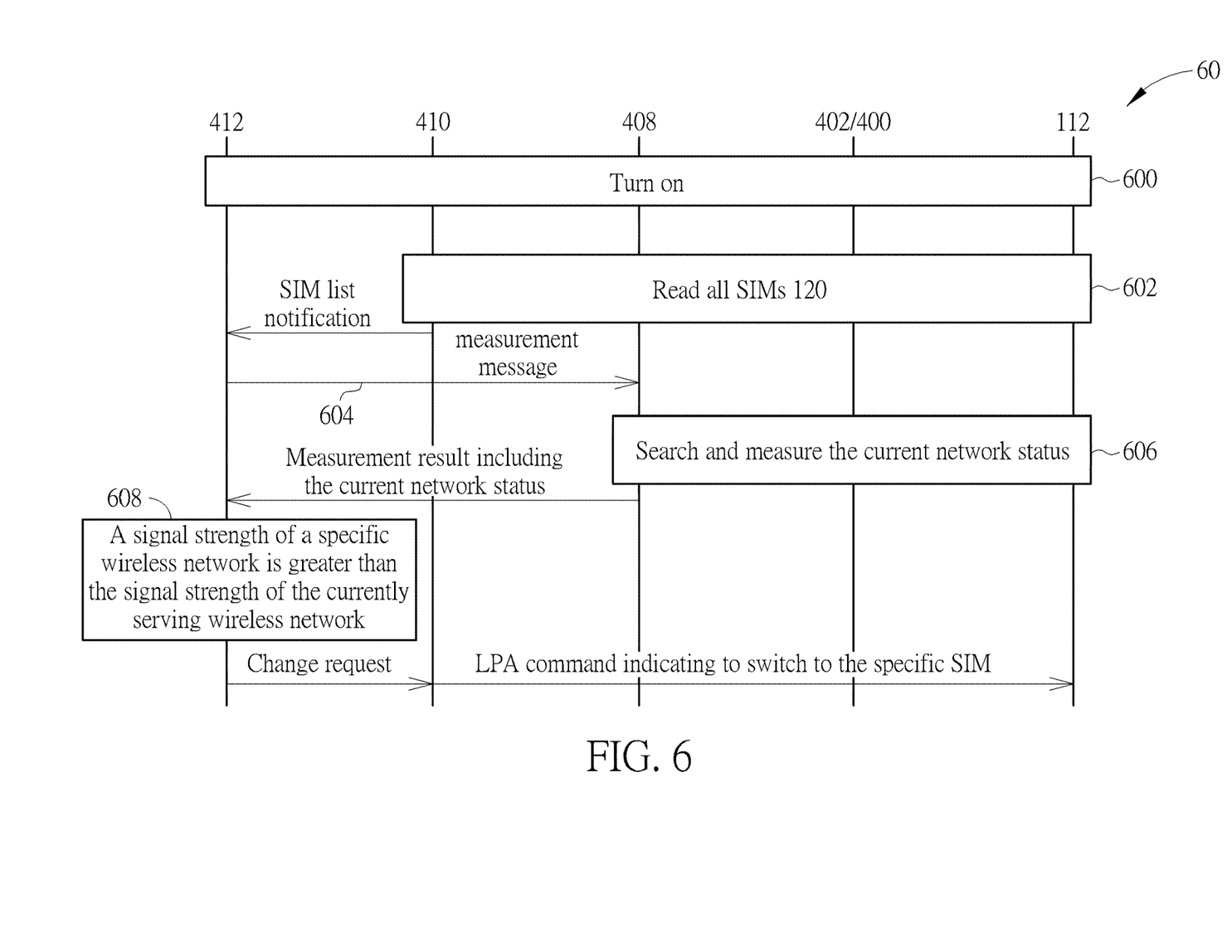
FIG. 6 is a schematic diagram of a wireless network connection management process of the software architecture shown in FIG. 4 according to another embodiment of the present invention.

In another embodiment, the present invention does not register to any wireless network after turned on, and the automatic selection application 412 searches for the network signals according to the plurality of SIMs 120, and automatically selects to connect with the wireless network with the best signals according to the network search results. Specifically, please refer to FIG. 6, which is a schematic diagram of a wireless network connection management process 60 of the software architecture 40 shown in FIG. 4 according to an embodiment of the present invention. As shown in FIG. 6, after turned on in step 600, in step 602, all the SIMs 120 are read, and a SIM list notification is sent to the automatic selection application 412. In step 604, the automatic selection application 412 sends a measurement message indicating to search for the currently network status. In step 606, after searching (such as performing manual search) and measuring the current network status, a measurement result including the current network status is sent to the automatic selection application 412. In step 608, in response to that the current network status in the measurement result indicates that a signal strength of a specific wireless network corresponding to a specific SIM is greatest in the current network status, the automatic selection application 410 selects to connect with the specific wireless network, and sends a change request to the control unit 410. Then, the control unit 410 sends a command (e.g., LPA command) to indicate to the UICC 112 to switch to the specific SIM. As a result, the present invention automatically searches for network signals when turned on and automatically selects to establish a connection with the wireless network with the best signals accordingly.

Figure 7:
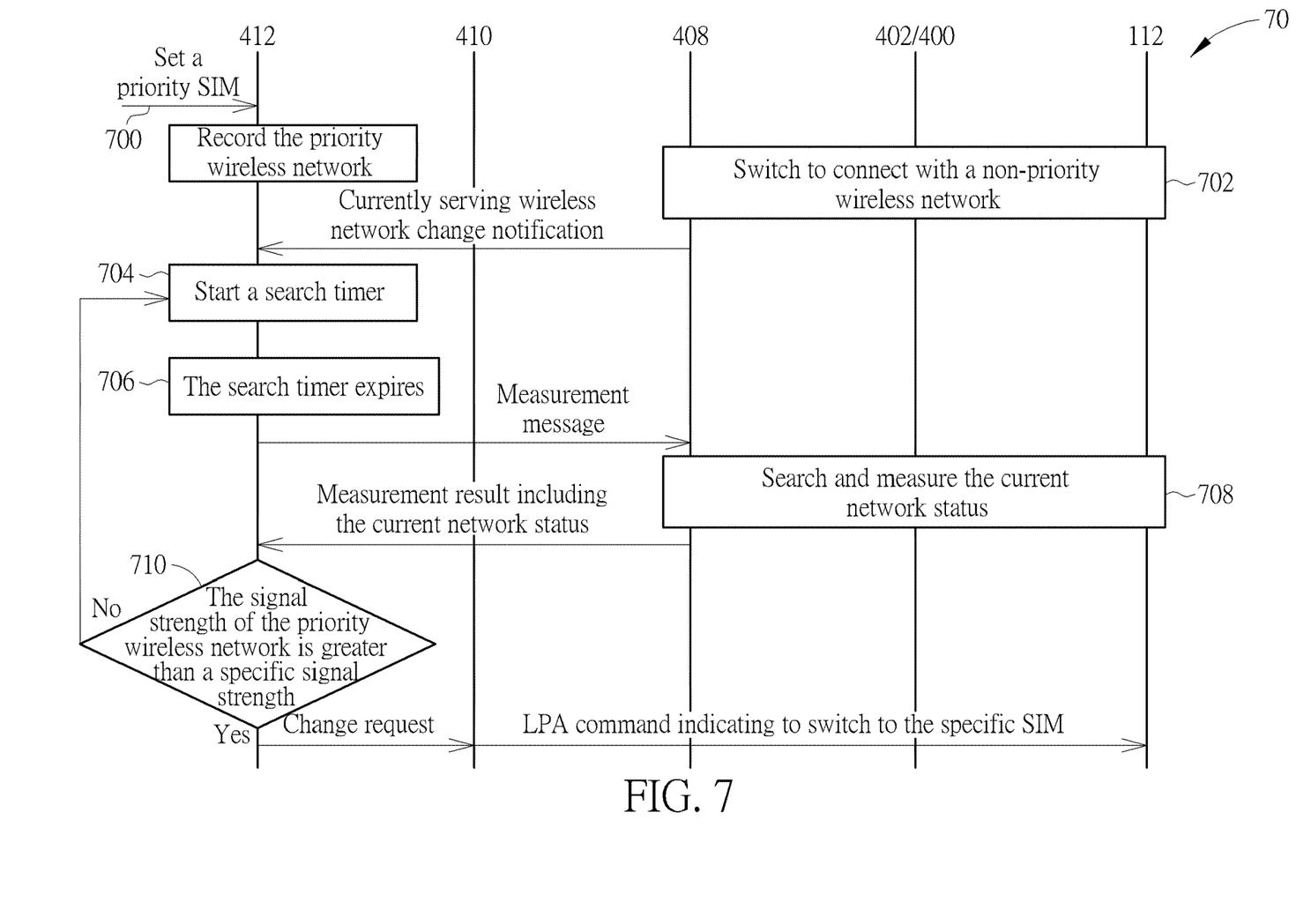
FIG. 7 is a schematic diagram of a wireless network connection management process of the software architecture shown in FIG. 4 according to another embodiment of the present invention.

In another embodiment, the user may set a priority wireless network through the user interface. In response to that the currently serving wireless network is different from the priority wireless network, the automatic selection application 412 will search for the network status at regular intervals. If the signal strength of the priority wireless network is greater than a specific value and thus available, the present invention switches to the priority wireless network. Specifically, please refer to FIG. 7, which is a schematic diagram of a wireless network connection management process 70 of the software architecture 40 shown in FIG. 4 according to an embodiment of the present invention. As shown in FIG. 7, in step 700, the user sets a priority SIM in the plurality of SIMs 120, wherein the priority SIM is corresponding to a priority wireless network (e.g., charging a lower fee), and the automatic selection application 412 records the priority wireless network. In Step 702, when switched to connect with a non-priority wireless network (e.g. because the signal strength of the priority wireless network is too low), a currently serving wireless network change notification is sent to the automatic selection application 412. In step 704, when acknowledging that the currently serving wireless network is different from the priority wireless network from the currently serving wireless network change notification, the automatic selection application 412 starts a search timer, wherein the search timer may be configured in the automatic selection application 412, and the automatic selection application 412 may be one of the applications 110 of the device memory 106.

In step 706, in response to that the search timer expires, the automatic selection application 412 sends a measurement message indicating to search for the current network status. In step 708, the present invention searches (e.g., manual search) and measures the current network status, and sends a measurement result including the current network status to the automatic selection application 412. In step 710, in response to that the current network status in the measurement result indicates that the signal strength of the priority wireless network is greater than a specific signal strength and thus available, the automatic selection application 412 selects to connect with the priority wireless networks, and sends a change request to the control unit 410. Then, the control unit 410 sends a command (e.g., LPA command) to indicate to the UICC 112 to switch to the priority SIM. On the other hand, in response to that the current network status in the measurement result indicates that the signal strength of the priority wireless network is less than the specific signal strength and thus not available, the present invention returns to step 704 and the automatic selection application 412 starts the search timer again. As a result, the present invention may switch back to the priority wireless network with preference when connecting with the non-priority wireless network.

In summary, the present invention may quickly switch back to the priority wireless network when establishing the connection with the non-priority wireless network due to short-term interference, and may reduce the frequency of searching network status and thus reduce power consumption when the priority wireless network may not provide services for a long time, thereby enhancing flexibility. In addition, the present invention may automatically select an appropriate SIM to establish a connection with the corresponding wireless network according to the current network status.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A wireless network connection management method, for a wireless communication device and at least one universal integrated circuit card (UICC), wherein the at least one UICC is disposed in the wireless communication device and the at least one UICC is corresponding to a plurality of subscriber identity modules (SIMs), the wireless network connection management method comprising:
the at least one UICC starting a search timer when utilizing a non-priority SIM of the plurality of SIMs to establish a connection with a non-priority wireless network;
the at least one UICC sending a search command to the wireless communication device in response to a first condition, wherein the first condition is that the search timer expires;

the wireless communication device searching for and obtaining a current network status, and sending a reply message indicating the current network status to the at least one UICC; and the at least one UICC informing and switching to a priority wireless network, and transmitting an update command to the wireless communication device in response to that the current network status indicates that a signal strength of the priority wireless network corresponding to a priority SIM of the plurality of SIMs is greater than a specific signal strength.

2. The wireless network connection management method of claim 1, wherein the at least one UICC is an embedded UICC (eUICC), and the plurality of SIMs are a plurality of electronic SIMS (eSIMs).

3. The wireless network connection management method of claim 1, wherein the at least one UICC is a plurality of removable UICCs corresponding to the plurality of SIMs, respectively.

4. The wireless network connection management method of claim 1, wherein the step of the at least one UICC starting the search timer when utilizing the non-priority SIM of the plurality of SIMs to establish the connection with the non-priority wireless network comprises:

activating a fall back mechanism to establish the connection with the non-priority wireless network with a signal strength greater than the specific signal strength in response to that the signal strength of the priority wireless network is less than the specific signal strength.

5. The wireless network connection management method of claim 1, wherein the step of the at least one UICC starting the search timer when utilizing the non-priority SIM of the plurality of SIMs to establish the connection with the non-priority wireless network comprises:

directly establishing the connection with the non-priority wireless network when the wireless communication device is turned on, wherein the non-priority wireless network was established with a connection before the wireless communication device was previously turned off.

6. The wireless network connection management method of claim 1 further comprising:

the at least one UICC restarting the search timer in response to that the current network status indicates that the signal strength of the priority wireless network is less than the specific signal strength.

7. The wireless network connection management method of claim 1, wherein the step of the at least one UICC starting the search timer when utilizing the non-priority SIM of the plurality of SIMs to establish the connection with the non-priority wireless network comprises:

setting the search timer to have a first time interval when establishing the connection with the non-priority wireless network and starting the search timer for a first time, and setting the search timer to have a second time interval when establishing the connection with the non-priority wireless network and starting the search timer not for the first time, wherein the first time interval is less than or equal to the second time interval.

8. The wireless network connection management method of claim 7, wherein the step of setting the search timer to have the first time interval when establishing the connection with the non-priority wireless network and starting the search timer for the first time, and setting the search timer to have the second time interval when establishing the connection with the non-priority wireless network and starting the search timer not for the first time, wherein the first time interval is less than or equal to the second time interval comprises:

setting the search timer to have the first time interval when establishing the connection with the non-priority wireless network and a number of times of starting the search timer are less than or equal to a first specific number of times, and setting the search timer to have the second time interval when establishing the connection with the non-priority wireless network and the number of times of starting the search timer are greater than the first specific number of times, wherein the first time interval is less than or equal to the second time interval.

9. The wireless network connection management method of claim 8 further comprising:

setting the search timer to have a third time interval when establishing the connection with the non-priority wireless network and the number of times of starting the search timer is greater than a second specific number, wherein the second time interval is less than the third time interval.

10. The wireless network connection management method of claim 7, wherein the step of setting the search timer to have the first time interval when establishing the connection with the non-priority wireless network and starting the search timer for the first time, and setting the search timer to have the second time interval when establishing the connection with the non-priority wireless network and starting the search timer not for the first time, wherein the first time interval is less than or equal to the second time interval comprises:

setting the search timer to have the first time interval in response to that a connecting time of establishing the connection with the non-priority wireless network in each cycle of at least one subsequent cycle is less than or equal to a first specific time length, and not starting the search timer in response to that the connecting time of establishing the connection with the non-priority wireless network in the each cycle of the at least one cycle is greater than the first specific time length, wherein a time length of the each cycle is the first specific time length plus a second specific time length.

11. A wireless network connection management method, for a wireless communication device and at least one universal integrated circuit card (UICC), wherein the at least one UICC is disposed in the wireless communication device and the at least one UICC is corresponding to a plurality of subscriber identity modules (SIMs), the wireless network connection management method comprising:

an automatic selection application of the wireless communication device sending a measurement message indicating to search for a current network status; and the automatic selection application selecting a specific SIM of the plurality of SIMs to establish a connection with a corresponding specific wireless network according to the current network status.

12. The wireless network connection management method of claim 11, wherein the at least one UICC is an embedded UICC (eUICC), and the plurality of SIMs are a plurality of electronic SIMS (eSIMs).

13. The wireless network connection management method of claim 11, wherein the at least one UICC is a plurality of removable UICCs corresponding to the plurality of SIMs, respectively.

14. The wireless network connection management method of claim 11, wherein the step of the automatic selection application of the wireless communication device sending the measurement message indicating to search for the current network status comprises:

the automatic selection application sending the measurement message indicating to search for the current network status in response to that a signal strength of a currently serving wireless network is less than a specific value.

15. The wireless network connection management method of claim 14, wherein the step of the automatic selection application selecting the specific SIM of the plurality of SIMs and establishing the connection with the specific wireless network corresponding to the specific SIM according to the current network status comprises:

the automatic selection application selecting to establish the connection with the specific wireless network in response to that the current network status indicates that a signal strength of the specific wireless network is greater than the signal strength of the currently serving wireless network.

16. The wireless network connection management method of claim 11, wherein the step of the automatic selection application of the wireless communication device sending the measurement message indicating to search for the current network status comprises:

the automatic selection application sending the measurement message indicating to search for the current network status after the wireless communication device is turned on.

17. The wireless network connection management method of claim 16, wherein the step of the automatic selection application selecting the specific SIM of the plurality of SIMs and establishing the connection with the specific wireless network corresponding to the specific SIM according to the current network status comprises:

the automatic selection application selecting to establish the connection with the specific wireless network in response to that the current network status indicates that a signal strength of the specific wireless network is greatest in the current network status.

18. The wireless network connection management method of claim 11, wherein the specific SIM and the specific wireless network are a priority SIM and a priority wireless network, and the step of the automatic selection application of the wireless communication device sending the measurement message indicating to search for the current network status comprises:

starting a search timer in response to that a currently serving wireless network is different from the priority wireless network; and the automatic selection application sending the measurement message indicating to search for the current network status in response to that the search timer expires.

19. The wireless network connection management method of claim 18, wherein the step of the automatic selection application selecting the specific SIM of the plurality of SIMs and establishing the connection with the specific wireless network corresponding to the specific SIM according to the current network status comprises:

the automatic selection application selecting to establish a connection with the priority wireless network in response to that the current network status indicates that a signal strength of the priority wireless network is greater than a specific signal strength.

20. The wireless network connection management method of claim 18, wherein the search timer is configured in the automatic selection application.

* * * * *